(12) United States Patent
Ashino

(10) Patent No.: US 12,323,445 B2
(45) Date of Patent: Jun. 3, 2025

(54) COMMUNICATION PROCESSING APPARATUS, COMMUNICATION PROCESSING SYSTEM, COMMUNICATION PROCESSING METHOD, AND PROGRAM

(71) Applicant: NEC Corporation, Tokyo (JP)

(72) Inventor: Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 200 days.

(21) Appl. No.: 18/016,193

(22) PCT Filed: Jul. 30, 2020

(86) PCT No.: PCT/JP2020/029323
§ 371 (c)(1),
(2) Date: Jan. 13, 2023

(87) PCT Pub. No.: WO2022/024321
PCT Pub. Date: Feb. 3, 2022

(65) Prior Publication Data
US 2023/0224315 A1    Jul. 13, 2023

(51) Int. Cl.
*H04L 29/06* (2006.01)
*H04L 9/40* (2022.01)

(52) U.S. Cl.
CPC ........ *H04L 63/1425* (2013.01); *H04L 63/308* (2013.01)

(58) Field of Classification Search
CPC ............. H04L 63/1425; H04L 63/0428; H04L 63/1408
See application file for complete search history.

(56) References Cited

U.S. PATENT DOCUMENTS

| | | | |
|---|---|---|---|
| 4,774,658 A * | 9/1988 | Lewin | G08B 25/14 340/8.1 |
| 6,453,360 B1 | 9/2002 | Muller et al. | |
| 11,290,493 B2 * | 3/2022 | Woolward | H04L 67/10 |
| 2015/0189047 A1 * | 7/2015 | Naaman | H04L 45/38 370/474 |
| 2019/0236270 A1 | 8/2019 | Yamane et al. | |
| 2021/0120029 A1 * | 4/2021 | Ross | G06F 21/577 |

(Continued)

FOREIGN PATENT DOCUMENTS

| | | | |
|---|---|---|---|
| JP | 2002-538733 A | 11/2002 | |
| JP | 2006-050433 A | 2/2006 | |
| JP | 2009-089224 A | 4/2009 | |

(Continued)

OTHER PUBLICATIONS

International Search Report for PCT Application No. PCT/JP2020/029323, mailed on Oct. 27, 2020.

(Continued)

*Primary Examiner* — Shawnchoy Rahman

(57) ABSTRACT

In order to appropriately accumulate communication data to be used for communication analysis, a communication processing apparatus 200 is configured to accumulate communication data to be used for communication analysis, and includes a data processing unit 235 configured to remove at least a part of the communication data to be accumulated, based on a communication property related to the communication data.

13 Claims, 15 Drawing Sheets

(56) References Cited

U.S. PATENT DOCUMENTS

2021/0306357 A1    9/2021   Onishi et al.

FOREIGN PATENT DOCUMENTS

| JP | 2020-017826 A | 1/2020 | | |
| WO | WO-2011037982 A1 * | 3/2011 | ............. | G06F 9/541 |
| WO | WO-2013067092 A1 * | 5/2013 | ............. | B42D 25/30 |
| WO | 2017/221979 A1 | 12/2017 | | |

OTHER PUBLICATIONS

Written opinion for PCT Application No. PCT/JP2020/029323, mailed on Oct. 27, 2020.
JP Office Communication for JP Application No. 2022-539919, mailed on Jan. 23, 2024 with English Translation.
English translation of Written opinion for PCT Application No. PCT/JP2020/029323, mailed on Oct. 27, 2020.

* cited by examiner

| ITEM NUMBER | TRANSMISSION TIME | TRANSMISSION SOURCE IP ADDRESS | DESTINATION IP ADDRESS | TRANSMISSION SOURCE PORT NUMBER | DESTINATION PORT NUMBER | PROTOCOL | FLAG | DATA |
|---|---|---|---|---|---|---|---|---|
| 1 | 10:24:51 101 | x.x.x.x | y.y.y.y | 12345 | 80 | TCP/IP | SYN | |
| 2 | 10:24:51 102 | y.y.y.y | x.x.x.x | 80 | 12345 | TCP/IP | SYN+ACK | |
| 3 | 10:24:51 321 | x.x.x.x | y.y.y.y | 12345 | 80 | TCP/IP | ACK | |
| 4 | 10:24:51 322 | x.x.x.x | y.y.y.y | 12345 | 80 | TCP/IP | PUSH | GET / HTTP / 1.0 |
| 5 | 10:25:01 910 | a.a.a.a | b.b.b.b | 57382 | 443 | TCP/IP | PUSH | ENCRYPTED DATA |
| 6 | 10:25:01 912 | b.b.b.b | a.a.a.a | 443 | 57382 | TCP/IP | PUSH+ACK | ENCRYPTED DATA |
| 7 | 10:25:02 142 | a.a.a.a | b.b.b.b | 57382 | 443 | TCP/IP | PUSH+ACK | ENCRYPTED DATA |

Fig. 7

| ITEM NUMBER | CONDITION | COMMUNICATION PROPERTY |
|---|---|---|
| 1 | TRANSMISSION SOURCE PORT NUMBER = 22 OR DESTINATION PORT NUMBER = 22 | SSH |
| 2 | TRANSMISSION SOURCE PORT NUMBER = 23 OR DESTINATION PORT NUMBER = 23 | Telnet |
| 3 | TRANSMISSION SOURCE PORT NUMBER = 80 OR DESTINATION PORT NUMBER = 80 | HTTP |
| 4 | TRANSMISSION SOURCE PORT NUMBER = 443 OR DESTINATION PORT NUMBER = 443 | SSL/TLS |

Fig. 8

| ITEM NUMBER | COMMUNICATION PROPERTY | PROCESSING |
|---|---|---|
| 1 | Telnet | ACCUMULATE ALL |
| 2 | SSH | ACCUMULATE AFTER REMOVING PAYLOAD |
| 3 | HTTP | ACCUMULATE ALL |
| 4 | SSL/TLS | ACCUMULATE AFTER REMOVING PAYLOAD |

Fig. 9

| CLIENT IP ADDRESS | SERVER IP ADDRESS | PROTOCOL | NUMBER OF UPLINK PACKETS | NUMBER OF DOWNLINK PACKETS |
|---|---|---|---|---|
| m.m.m.m | n.n.n.n | HTTP | 51 | 43 |
| x.x.x.x | y.y.y.y | SSL/TLS | 5 | 8 |

Fig. 12

| ITEM NUMBER | COMMUNICATION PROPERTY | PROCESSING |
|---|---|---|
| 1 | Telnet | ACCUMULATE ALL |
| 2 | SSH | AFTER START OF COMMUNICATION, ACCUMULATE PAYLOAD UNTIL TOTAL VOLUME OF UPLINK/DOWNLINK COMMUNICATION REACHES 10 kB |
| 3 | HTTP | ACCUMULATE ALL |
| 4 | SSL/TLS | UPLINK: ACCUMULATE PAYLOAD UP TO FIRST 3 PACKETS<br>DOWNLINK: ACCUMULATE PAYLOAD UP TO FIRST 2 PACKETS |

Fig. 13

COMMUNICATION PROCESSING APPARATUS, COMMUNICATION PROCESSING SYSTEM, COMMUNICATION PROCESSING METHOD, AND PROGRAM

This application is a National Stage Entry of PCT/JP2020/029323 filed on Jul. 30, 2020, the contents of all of which are incorporated herein by reference, in their entirety.

TECHNICAL FIELD

The present invention relates to a communication processing apparatus, a communication processing system, a communication processing method, and a program.

BACKGROUND ART

Data communication via the Internet being a global network connecting a large number of computer networks to each other has been utilized. In the data communication described above, various types of processing such as security analysis are executed based on communication data (traffic) flowing in the networks.

For example, PTL 1 discloses a traffic monitoring technique for monitoring traffic flowing through a communication network and collecting traffic information. In the technique of PTL 1, in traffic monitoring, a communication protocol is converted depending on a predetermined condition (for example, decapsulation of a Generic Routing Encapsulation (GRE) tunnel).

PTL 2 discloses a transmission technique for transmitting packets from a network to a computer system. In the technique of PTL 2, syntax analysis is performed on a header part of such packets, and results of the syntax analysis are used for reassembling of the packet data.

CITATION LIST

Patent Literature

[PTL 1] JP 2006-050433 A
[PTL 2] JP 2002-538733 T

SUMMARY

Technical Problem

In communication analysis such as security analysis, not necessarily all of pieces of communication data can be used for the communication analysis. For example, it is difficult to decode and use encrypted parts of the communication data for the communication analysis. In a configuration in which all of such pieces of communication data including parts unsuitable for the communication analysis as described above are accumulated for the communication analysis, traffic to an accumulation destination is increased, and furthermore, a large quantity of storage for accumulation is consumed. When a meter rate service is used, a system load as described above also leads to an increase in costs.

The techniques disclosed in PTL 1 and PTL 2 described above are not intended to solve the issue described above.

In view of the circumstances described above, an example object of the present invention is to provide a communication processing apparatus, a communication processing system, a communication processing method, and a program that enable appropriate accumulation of communication data to be used for communication analysis.

Solution to Problem

A communication processing apparatus, according to an example aspect of the present disclosure, configured to accumulate communication data to be used for communication analysis, the communication processing apparatus including: a data processing unit configured to remove at least a part of the communication data to be accumulated, based on a communication property related to the communication data.

A communication processing system, according to an example aspect of the present disclosure, configured to accumulate communication data to be used for communication analysis, the communication processing system including: a communication processing apparatus provided with a data processing unit configured to remove at least a part of the communication data to be accumulated, based on a communication property related to the communication data.

A communication processing method, according to an example aspect of the present disclosure, for accumulating communication data to be used for communication analysis, the communication processing method including: removing at least a part of the communication data to be accumulated, based on a communication property related to the communication data.

16. A program, according to an example aspect of the present disclosure, that causes a computer to execute: accumulating communication data to be used for communication analysis; and removing at least a part of the communication data to be accumulated, based on a communication property related to the communication data.

Advantageous Effects of Invention

According to the present invention, it is possible to provide a communication processing apparatus, a communication processing system, a communication processing method, and a program that enable appropriate accumulation of communication data to be used for communication analysis.

BRIEF DESCRIPTION OF THE DRAWINGS

FIG. 7 is an example of communication data acquired by a communication observation unit 231 according to the first example embodiment of the present invention;

FIG. 8 is an explanatory diagram illustrating an example of a configuration of a parser DB 221 according to the first example embodiment of the present invention;

FIG. 9 is an explanatory diagram illustrating an example of a configuration of a policy DB 225 according to the first example embodiment of the present invention;

FIG. 12 is an explanatory diagram illustrating an example of a configuration of a communication state DB 223 according to the example alteration of the first example embodiment of the present invention;

FIG. 13 is an explanatory diagram illustrating an example of a configuration of a policy DB 225 according to the example alteration of the first example embodiment of the present invention;

DESCRIPTION OF THE EXAMPLE EMBODIMENTS

Figure 1:
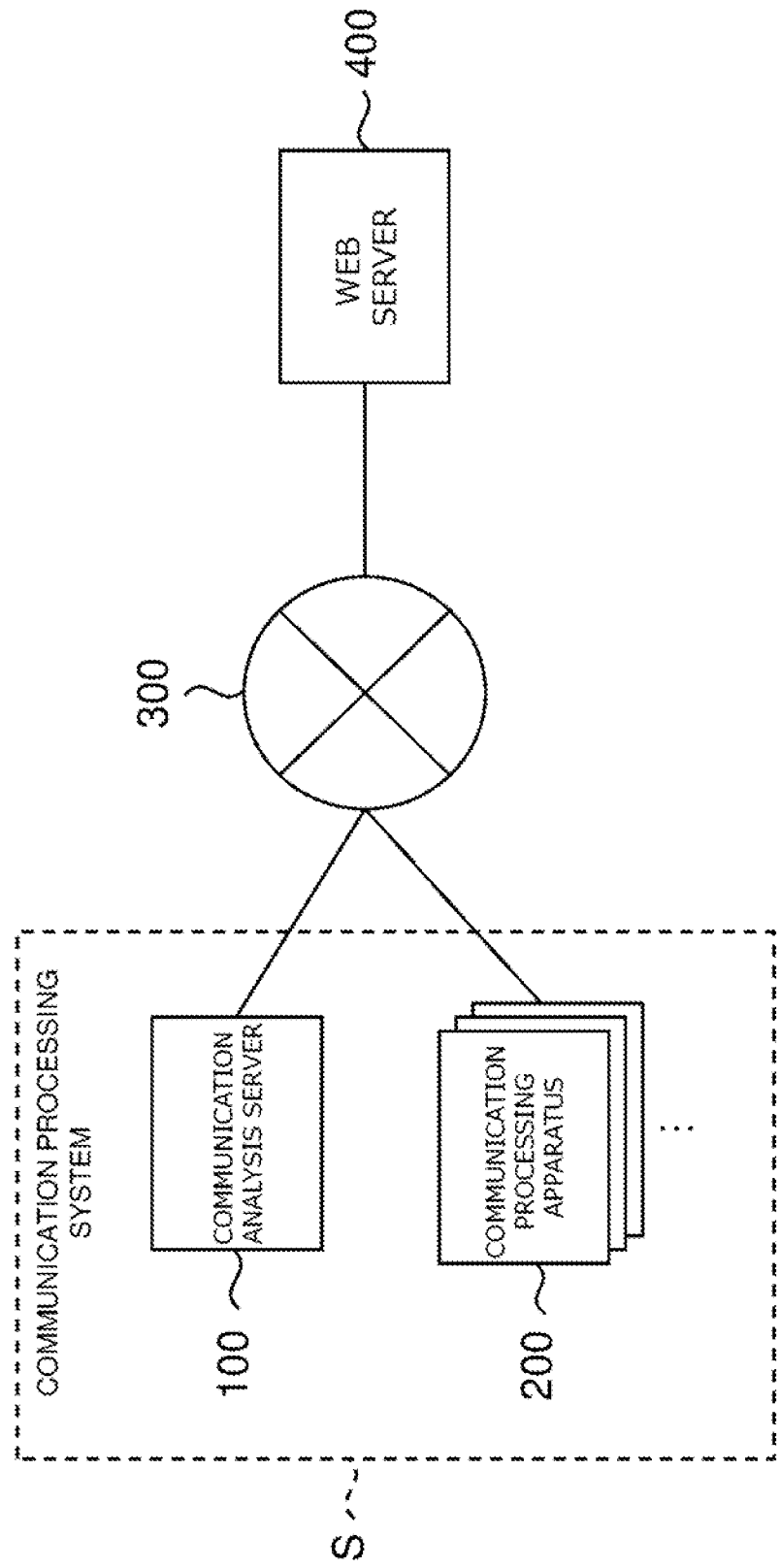
FIG. 1 is an explanatory diagram illustrating an example of a schematic configuration of a communication processing system S according to a first example embodiment of the present invention.

Hereinafter, example embodiments of the present invention will be described in detail with reference to the accompanying drawings. Note that, in the Specification and drawings, elements to which similar descriptions are applicable are denoted by the same or corresponding reference signs, and overlapping descriptions may hence be omitted.

Each example embodiment described below is merely an example of a configuration that can implement the present invention. Each example embodiment described below can be appropriately modified or changed according to a configuration of an apparatus to which the present invention is applied and various conditions. All of combinations of elements included in each example embodiment described below are not necessarily required to implement the present invention, and a part of the elements can be appropriately omitted. Hence, the scope of the present invention is not limited by the configuration described in each example embodiment described below. Configurations in which a plurality of configurations described in the example embodiments are combined can also be adopted unless the configurations are consistent with each other.

Descriptions according to the present invention will be given in the following order.

1. Overview of Example Embodiments of Present Invention
2. First Example Embodiment
   2.1. Configuration of Communication Processing System S
   2.2. Configuration of Communication Analysis Server 100
   2.3. Configuration of Communication Processing Apparatus 200
   2.4. Configuration of Web Server 400
   2.5. Operation Example
   2.6. Example Alterations
3. Second Example Embodiment
   3.1. Configuration of Communication Processing System Sa
   3.2. Configuration of Communication Processing Apparatus 200a
   3.3. Operation Example
4. Other Example Embodiments

1. Overview of Example Embodiments of Present Invention

First, an overview of example embodiments of the present invention will be described.

(1) Technical Issue

Data communication via the Internet being a global network connecting a large number of computer networks to each other has been utilized. In the data communication described above, various types of processing such as security analysis are executed based on communication data (traffic) flowing in the networks.

In communication analysis such as security analysis, not necessarily all of pieces of communication data can be used for the communication analysis. For example, it is difficult to decode and use encrypted parts of the communication data for the communication analysis. In a configuration in which all of such parts as described above are accumulated for the communication analysis, traffic to an accumulation destination is increased, and furthermore, a large quantity of storage for accumulation is consumed.

In view of the circumstances described above, the present example embodiment has an example object to appropriately accumulate communication data to be used for communication analysis.

(2) Technical Features

In the example embodiment of the present invention, a communication processing apparatus that accumulates communication data to be used for communication analysis removes at least a part of the communication data to be accumulated, based on a communication property related to the communication data.

According to the configuration described above, communication data to be used for communication analysis can be appropriately accumulated. Note that, according to the present invention, instead of or together with the above effects, other effects may be exerted. Note that the technical features described above are merely a specific example of the example embodiments of the present invention, and as a matter of course, the example embodiments of the present invention are not limited to the technical features described above.

2. First Example Embodiment

<<2.1. Configuration of Communication Processing System S>>

Next, a first example embodiment of the present invention will be described with reference to FIG. 1 to FIG. 10. FIG. 1 is an explanatory diagram illustrating an example of a schematic configuration of a communication processing system S according to the first example embodiment of the present invention. As illustrated in FIG. 1, the communication processing system S of the present example embodiment includes a communication analysis server 100 and one or more communication processing apparatuses 200. The communication analysis server 100 and the communication processing apparatus(es) 200 can communicate with each other via a network 300.

The communication processing apparatus(es) 200 can access a web server 400 via the network 300 under control of the communication analysis server 100. The web server 400 returns a predetermined response to the access from a communication node such as the communication processing apparatus(es) 200. Note that the web server 400 may be a content delivery network (CDN).

Schematically, in the communication processing system S according to the present example embodiment, communication between the communication processing apparatus(es) 200 and the web server 400 is accumulated in the communication analysis server 100. The communication processing apparatus(es) 200 accesses the web server 400 based on direct and/or indirect control performed by the communication analysis server 100, and transfers transmitted and received communication data (packets) to the communication analysis server 100 and causes the communication analysis server 100 to accumulate the communication data (packets).

The communication processing apparatus(es) 200 may transfer communication data supplied from the communication analysis server 100 to the web server 400, or the communication processing apparatus(es) 200 itself may access the web server 400. At least one of the communication processing apparatuses 200 and the communication analysis server 100 may be integrally configured.

The communication processing system S according to the present example embodiment is a system including a plurality of nodes communicating in accordance with a predetermined Internet protocol suite (for example, Transmission Control Protocol/Internet Protocol, TCP/IP). Note that the communication processing system S may be a system conforming to another standard.

<<2.2. Configuration of Communication Analysis Server 100>>

The communication analysis server 100 according to the present example embodiment accumulates and analyzes communication data obtained through communication between the communication processing apparatus(es) 200 and the web server 400. The communication analysis server 100 can control the communication processing apparatus(es) 200 to cause the communication processing apparatus(es) 200 to access the web server 400, and may transmit and receive communication data to and from the web server 400 via the communication processing apparatus(es) 200.

Figure 2:
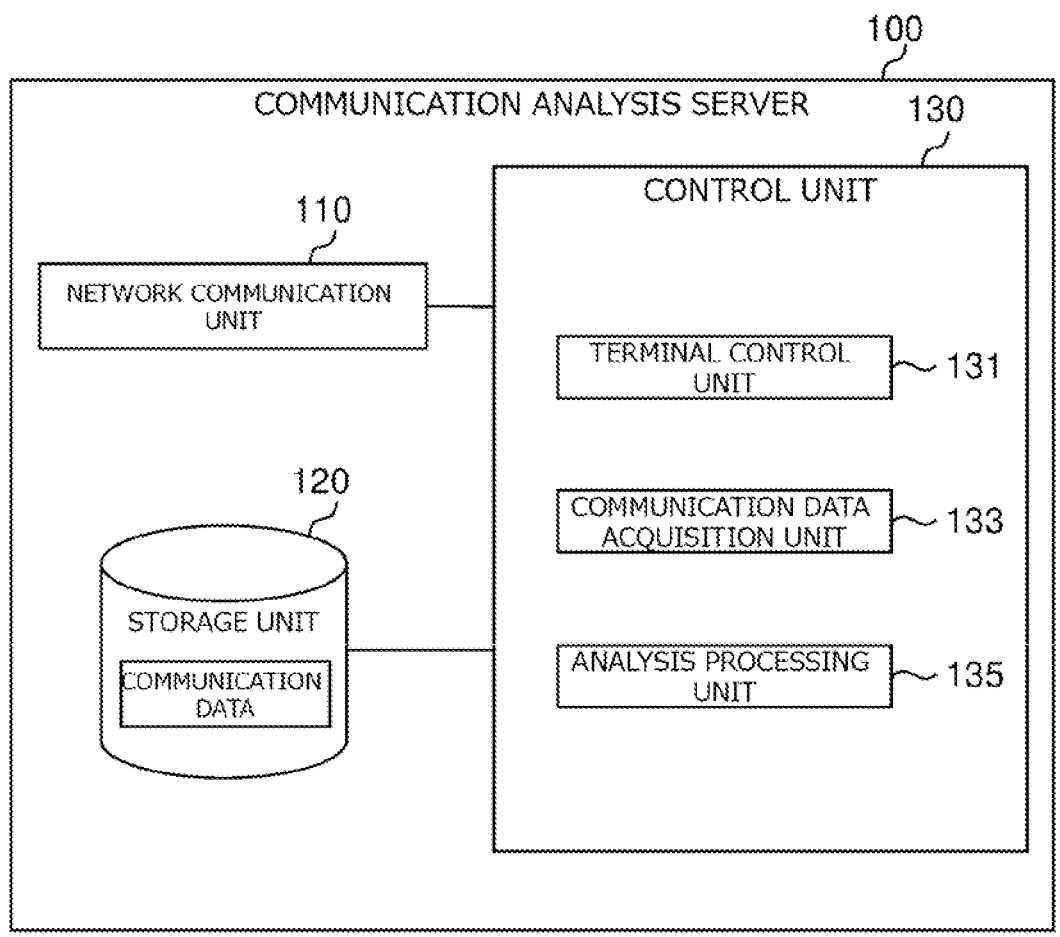
FIG. 2 is a block diagram illustrating a schematic configuration of a communication analysis server 100 according to the first example embodiment of the present invention.

FIG. 2 is a block diagram illustrating a schematic configuration of the communication analysis server 100. As illustrated in FIG. 2, the communication analysis server 100 includes a network communication unit 110, a storage unit 120, and a control unit 130.

The network communication unit 110 is an element that transmits and receives signals to and from another apparatus, such as the communication processing apparatus(es) 200, via the network 300. The network communication unit 110 may be, for example, implemented with a network adapter and/or a network interface card (NIC).

The storage unit 120 is an element that temporarily or permanently stores a program (instructions) and data used to execute various types of processing in the communication analysis server 100. The program includes one or more instructions for operations of the communication analysis server 100. The storage unit 120 may be, for example, implemented with a volatile memory, a nonvolatile memory, a storage medium such as a magnetic disk, or a combination of two or more types of these. The storage unit 120 may be integrally configured with one or more processors constituting the control unit 130.

Further, the storage unit 120 accumulates communication data transmitted (transferred) from the one or more communication processing apparatuses 200. Properties of such accumulated communication data will be described later. Note that an accumulation server that accumulates communication data from the communication processing apparatus(es) 200 may be provided separately from the communication analysis server 100.

The control unit 130 is an element that provides various functions of the communication analysis server 100, and includes, as its function blocks, a terminal control unit 131, a communication data acquisition unit 133, and an analysis processing unit 135. Note that the control unit 130 may further include constituent elements other than the function blocks described above. In other words, the control unit 130 can execute operations other than operations of the function blocks described above. For example, the control unit 130 may function as a database management system (DBMS), and may cooperate with the storage unit 120 to implement a relational database (RDB).

The control unit 130 may be, for example, implemented with one or more processors. The control unit 130 may deploy the program stored in the storage unit 120, in the storage unit 120 and/or a system memory (not illustrated) to execute the program, to thereby implement processing according to the present example embodiment to be described later. Note that each of the function blocks (the terminal control unit 131, the communication data acquisition unit 133, and the analysis processing unit 135) may be implemented with one or more processors different from those of the control unit 130. An outline of the processing performed by the control unit 130 will be described below.

The terminal control unit 131 executes control of the communication processing apparatus(es) 200 (for example, access control to the web server 400). The communication data acquisition unit 133 acquires communication data from one or more communication processing apparatuses 200, and accumulates the communication data in the storage unit 120. The analysis processing unit 135 executes communication analysis (for example, security analysis), based on the communication data accumulated in the storage unit 120.

Note that the communication analysis server 100 may be virtualized. In other words, the communication analysis server 100 may be implemented as a virtual machine. In this case, the communication analysis server 100 (virtual machine) may operate as a physical machine (hardware) including a processor, a memory, and the like, and a virtual machine on a hypervisor.

<<2.3. Configuration of Communication Processing Apparatus 200>>

Each of the communication processing apparatuses 200 according to the present example embodiment is a communication terminal that accesses the web server 400 based on direct and/or indirect control performed by the communication analysis server 100, and transfers communication data (packets) transmitted and received through the communication processing apparatus 200 to the communication analysis server 100 and causes the communication analysis server 100 to accumulate the communication data (packets). The one or more communication processing apparatuses 200 included in the communication processing system S can be configured similarly to each other, which thus will be exemplified by one communication processing apparatus 200 in the following description.

Figure 3:
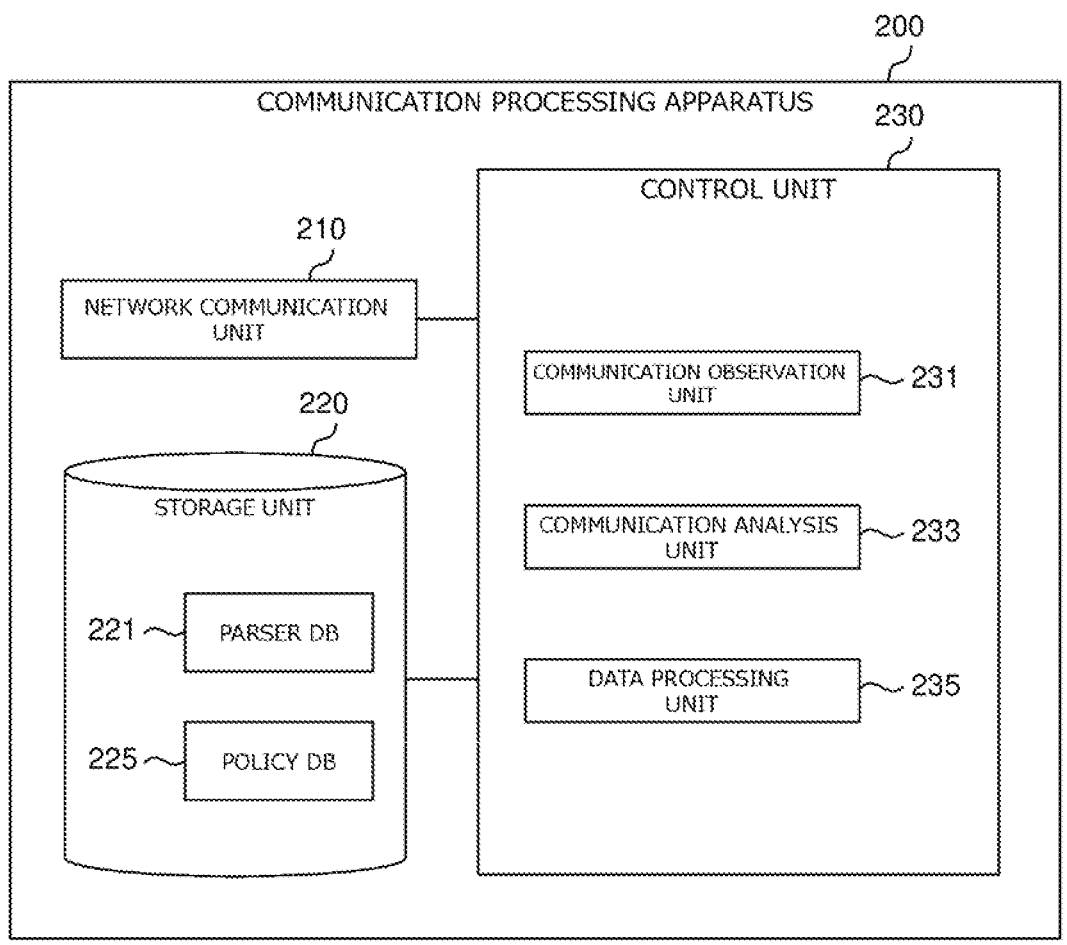
FIG. 3 is a block diagram illustrating a schematic configuration of a communication processing apparatus 200 according to the first example embodiment of the present invention.

FIG. 3 is a block diagram illustrating a schematic configuration of the communication processing apparatus 200. As illustrated in FIG. 3, the communication processing apparatus 200 includes a network communication unit 210, a storage unit 220, and a control unit 230.

The network communication unit 210 is an element that transmits and receives signals to and from another apparatus (for example, the communication analysis server 100 and the web server 400) via the network 300. The network communication unit 210 may be, for example, implemented with a network adapter and/or a network interface card.

The storage unit 220 is an element that temporarily or permanently stores a program (instructions) and data used to execute various types of processing in the communication processing apparatus 200. The program includes one or more instructions for operations of the communication processing apparatus 200. The storage unit 220 may be, for example, implemented with a volatile memory, a nonvolatile memory, a storage medium such as a magnetic disk, or a combination of two or more types of these. The storage unit 220 may be integrally configured with one or more processors constituting the control unit 230.

The storage unit 220 further includes a parser database (parser DB) 221 used for communication analysis and a policy database (policy DB) 225 used for data processing. The details of each of the databases will be described later.

The control unit 230 is an element that provides various functions of the communication processing apparatus 200, and includes, as its function blocks, a communication observation unit 231, a communication analysis unit 233, and a data processing unit 235. Note that the control unit 230 may further include constituent elements other than the function blocks described above. In other words, the control unit 230 can execute operations other than operations of the function blocks described above.

The control unit 230 may be, for example, implemented with one or more processors. The control unit 230 may deploy the program stored in the storage unit 220, in the storage unit 220 and/or a system memory (not illustrated) to execute the program, to thereby implement processing according to the present example embodiment to be described later. Note that each of the function blocks (the communication observation unit 231, the communication analysis unit 233, and the data processing unit 235) may be implemented with one or more processors different from those of the control unit 230. An outline of the processing performed by the control unit 230 will be described below.

The communication observation unit 231 observes and acquires communication data transmitted and received via the communication processing apparatus 200 (network communication unit 210), and supplies the communication data to the communication analysis unit 233. The communication analysis unit 233 analyzes the communication data supplied from the communication observation unit 231 with reference to the parser DB 221, and outputs analysis results indicating a communication property related to the communication data to the data processing unit 235. The data processing unit 235 processes the communication data acquired by the communication observation unit 231 with reference to the policy DB 225, based on the analysis results (communication property) supplied from the communication analysis unit 233. The processed communication data is transmitted (transferred) to the communication analysis server 100 via the network communication unit 210.

Note that, instead of the communication data transmitted and received via the communication processing apparatus 200, the communication observation unit 231 may capture and acquire communication data transmitted and received via another apparatus and supply the communication data to the communication analysis unit 233.

The communication processing apparatus 200 may be configured as a proxy server. In other words, at the time of relaying communication from another apparatus such as the communication analysis server 100, the communication processing apparatus 200 may behave as if the communication processing apparatus 200 carries out access (access from an IP address of the communication processing apparatus 200).

Note that the communication processing apparatus 200 may be virtualized. In other words, the communication processing apparatus 200 may be implemented as a virtual machine. In this case, the communication processing apparatus 200 (virtual machine) may operate as a physical machine (hardware) including a processor, a memory, and the like, and a virtual machine on a hypervisor.

<<2.4. Configuration of Web Server 400>>

The web server 400 according to the present example embodiment transmits (returns) communication data (packets) in response to access from the communication processing apparatus 200. The web server 400 may be a single server apparatus, or may be a content delivery network in which a plurality of delivery servers and a control server that controls the delivery servers are provided.

Figure 4:
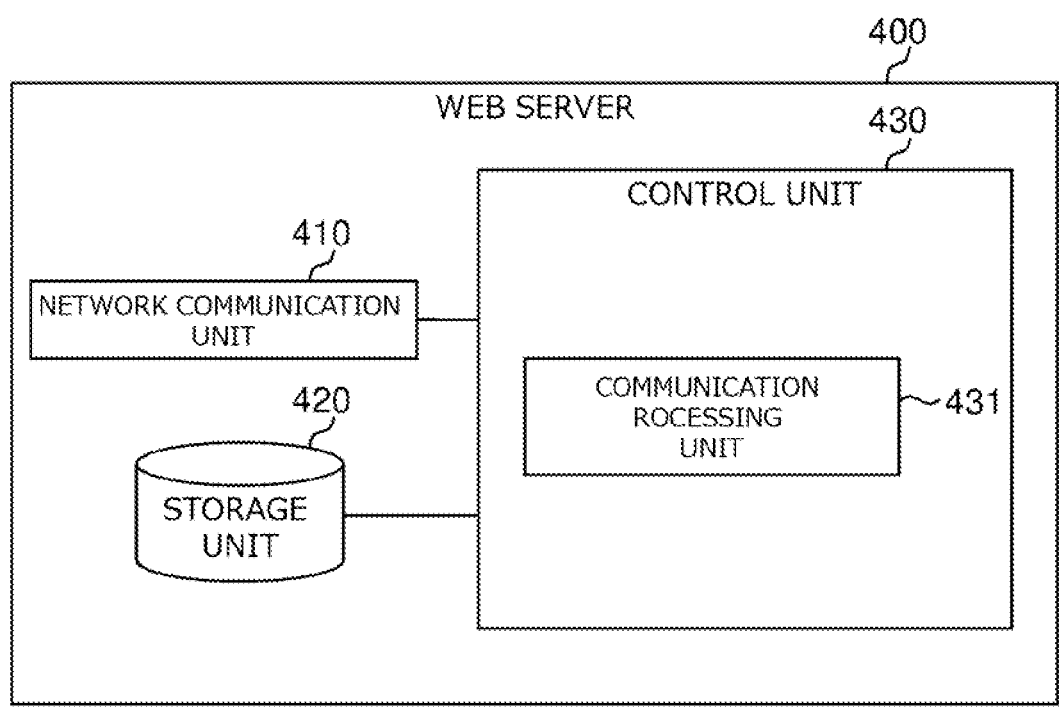
FIG. 4 is a block diagram illustrating a schematic configuration of a web server 400 according to the first example embodiment of the present invention.

FIG. 4 is a block diagram illustrating a schematic configuration of the web server 400. As illustrated in FIG. 4, the web server 400 includes a network communication unit 410, a storage unit 420, and a control unit 430.

The network communication unit 410 is an element that transmits and receives signals to and from another apparatus, such as the communication processing apparatus(es) 200, via the network 300. The network communication unit 210 may be, for example, implemented with a network adapter and/or a network interface card.

The storage unit 420 is an element that temporarily or permanently stores a program (instructions) and data used to execute various types of processing in the web server 400. The program includes one or more instructions for operations of the web server 400. The storage unit 420 stores data (content data) used to generate communication data to be transmitted to the communication processing apparatus 200. The storage unit 420 may be, for example, implemented with a volatile memory, a nonvolatile memory, a storage medium such as a magnetic disk, or a combination of two or more types of these. The storage unit 420 may be integrally configured with one or more processors constituting the control unit 430.

The control unit 430 is an element that provides various functions of the web server 400, and includes, as its function block, a communication processing unit 431 that transmits communication data in response to a request from the communication processing apparatus 200. Note that the control unit 430 may further include constituent elements other than the function block described above. In other words, the control unit 430 can execute operations other than operations of the function block described above. The control unit 430 may be, for example, implemented with one or more processors. The control unit 430 may deploy the program stored in the storage unit 420, in the storage unit 420 and/or a system memory (not illustrated) to execute the program, to thereby implement processing according to the present example embodiment to be described later. Note that each function block (the communication processing unit 431) may be implemented with one or more processors different from those of the control unit 430.

<<2.5. Operation Example>>

Figure 5:
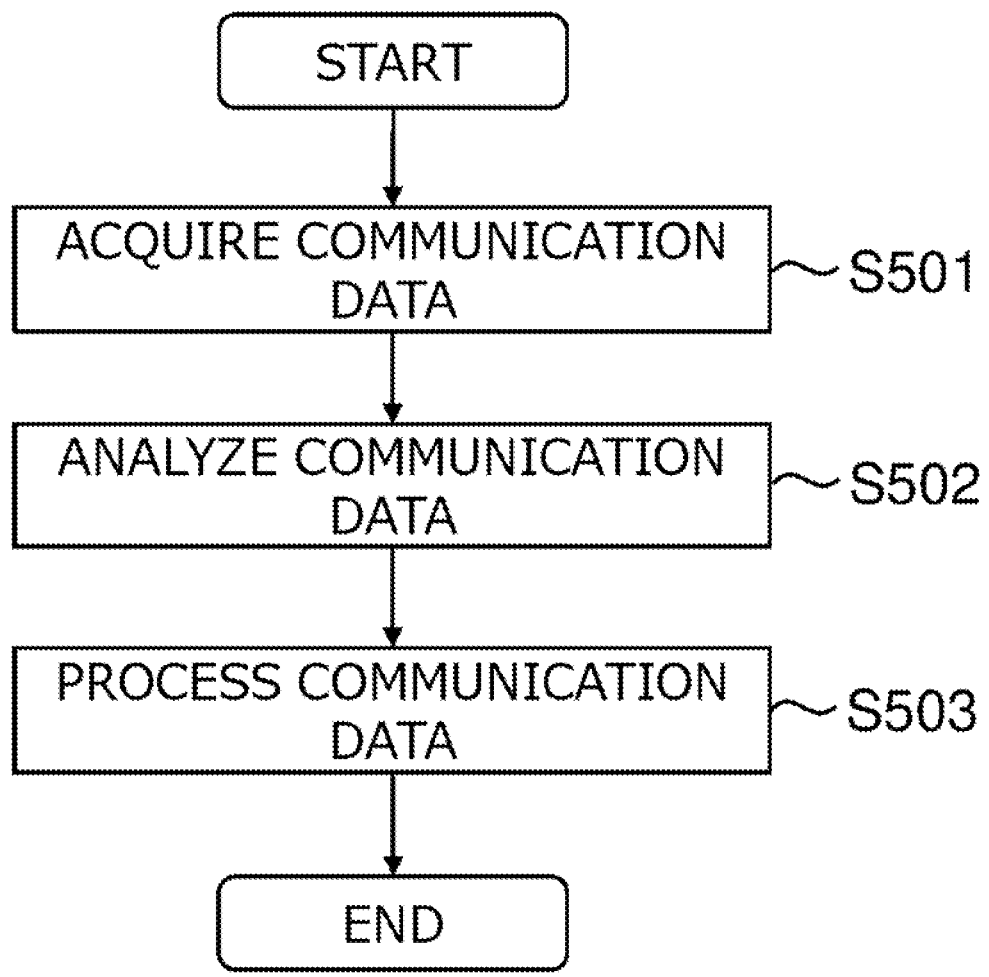
FIG. 5 is a flowchart illustrating an example of a flow of data processing according to the first example embodiment of the present invention.

With reference to FIG. 5 to FIG. 10, an example of data processing according to the first example embodiment of the present invention will be described. FIG. 5 is a flowchart illustrating an example of a flow of data processing according to the present example embodiment.

In Step S501, the communication observation unit 231 of the communication processing apparatus 200 observes (in other words, acquires) communication data transmitted and received to and from the web server 400, and supplies the communication data to the communication analysis unit 233. The communication observation unit 231 may, for example, supply the communication data to the communication analysis unit 233 in the unit of a frame to be described later.

Figure 6:
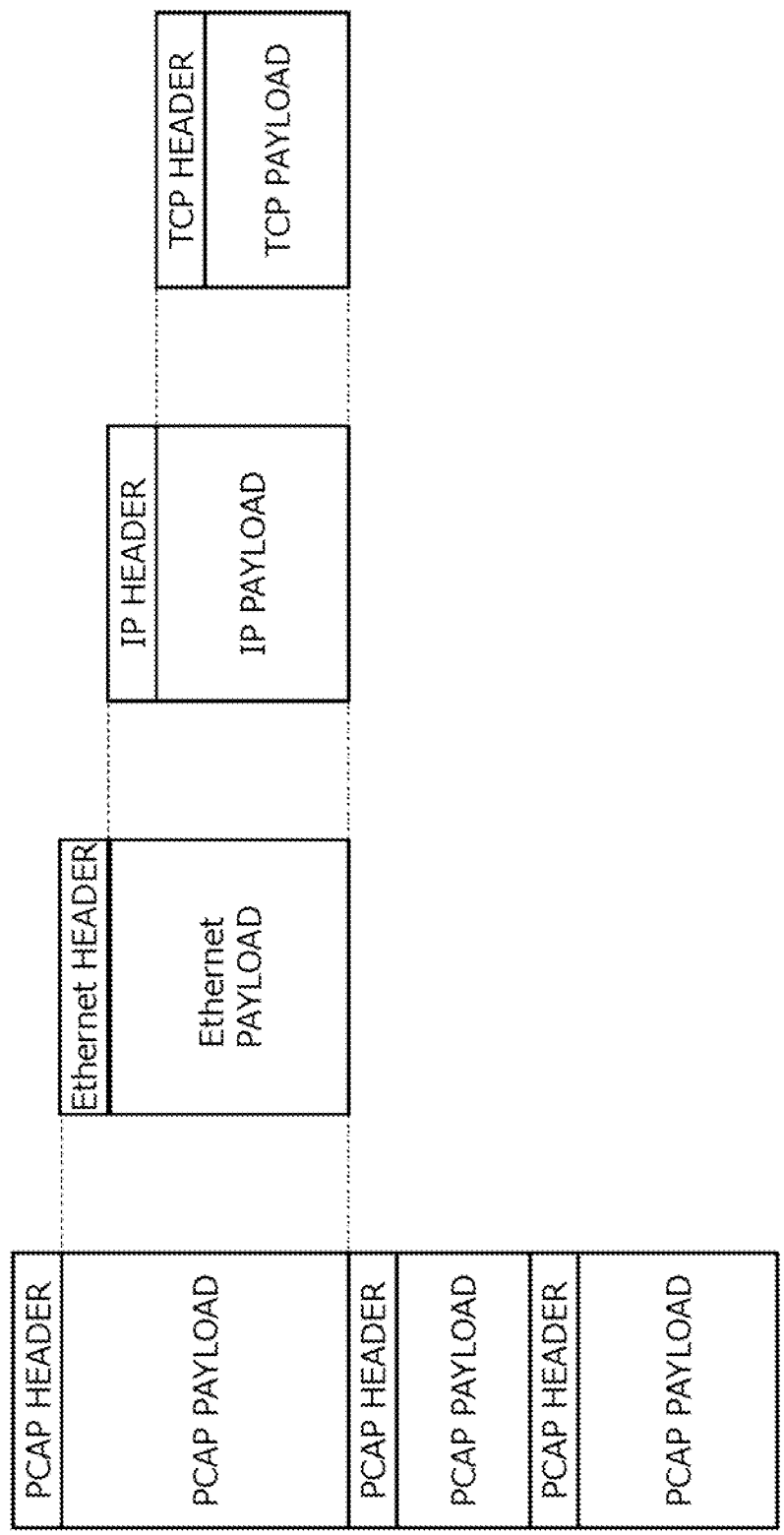
FIG. 6 is an explanatory diagram illustrating a structure of accumulated communication data (PCAP data) according to the first example embodiment of the present invention.

FIG. 6 is an explanatory diagram for illustrating a structure of accumulated communication data (PCAP data) according to the present example embodiment. In the present example embodiment, a data unit (a frame or the like) transmitted and received in the network is included as a payload (PCAP payload), and communication data is accumulated in a form of packet capture data (PCAP data), in which a header (PCAP header) is given to the above-mentioned payload.

The PCAP data is, for example, recorded in a single electronic file in a continuous manner. The PCAP header does not include a piece of data (a pointer or the like) for referring to another piece of PCAP data. The PCAP data is used for communication analysis such as security analysis.

As illustrated in FIG. 6, the PCAP data includes a plurality of pairs of a PCAP header and a PCAP payload. One PCAP payload corresponds to one piece of unit communication data (for example, a frame of a media access control (MAC) layer). A payload of the MAC layer includes a packet (IP header+IP payload) being a data unit of an IP layer. A payload of the IP layer includes a segment (TCP header+TCP payload) being a data unit of a TCP layer. Note that the frame may be referred to as an "Ethernet (registered trademark) packet", the packet may be referred to as an "IP packet", and the segment may be referred to as a "TCP packet".

In Step S502, the communication analysis unit 233 of the communication processing apparatus 200 analyzes the communication data supplied from the communication observation unit 231 with reference to the parser DB 221, and outputs analysis results indicating a communication property related to the communication data to the data processing unit 235. In Step S503, the data processing unit 235 of the communication processing apparatus 200 processes the communication data acquired by the communication observation unit 231 with reference to the policy DB 225, based on the analysis results (communication property) supplied from the communication analysis unit 233. With reference to FIG. 7 to FIG. 9, description will be given in further detail.

FIG. 7 is an example of communication data acquired by the communication observation unit 231 according to the present example embodiment. Each row corresponds to one piece of unit communication data (for example, a frame). Each column indicates an element included in the unit communication data for each item. Each piece of unit communication data is assigned an item number. As illustrated in FIG. 7, each piece of unit communication data includes, as its elements, transmission time, a transmission source IP address, a destination IP address, a transmission source port number, a destination port number, a protocol, a flag, and data.

FIG. 8 is an explanatory diagram illustrating an example of a configuration of the parser DB 221 according to the present example embodiment. The parser DB 221 is a database that stores correspondence between a parameter of communication data (unit communication data) and a communication property. For example, as illustrated in item number 1 of FIG. 8, when the "transmission source port number" of unit communication data is "22" or the "destination port number" thereof is "22", the communication property (protocol name) related to the unit communication data is "Secure Shell (SSH)". Similarly, other item numbers also each indicate correspondence between a port number and a communication property (protocol name).

In Step S502, the communication analysis unit 233 identifies the communication property of the unit communication data with reference to the parser DB 221, and outputs analysis results indicating the identified communication property to the data processing unit 235.

FIG. 9 is an explanatory diagram illustrating an example of a configuration of the policy DB 225 according to the present example embodiment. The policy DB 225 is a database that stores correspondence between a communication property (analysis results) related to communication data and processing for the communication data. For example, as illustrated in item number 1 of FIG. 9, when the communication property of unit communication data is "Telnet", all of the unit communication data is accumulated. As illustrated in item number 2 of FIG. 9, when the communication property of unit communication data is "SSH", the unit communication data is accumulated after a payload corresponding to an encrypted part (in other words, a part not used for communication analysis) is removed.

In Step S503, with reference to the policy DB, the data processing unit 235 executes processing corresponding to the communication property indicated by the analysis results supplied from the communication analysis unit 233 on the unit communication data.

The processing of Steps S501 to S503 described above may be, for example, executed every time communication via the communication processing apparatus 200 is executed (in other words, every time the communication observation unit 231 acquires communication data).

The communication data may be accumulated in any location. For example, the communication data may be temporarily accumulated in the storage unit 220 of the communication processing apparatus 200, and subsequently the communication data may be transferred from the communication processing apparatus 200 to the communication analysis server 100 once every predetermined time period (for example, every other week), so as to be accumulated in the storage unit 120. The communication data may not be accumulated in the communication processing apparatus 200, and the communication data may be transferred from the communication processing apparatus 200 to the communication analysis server 100 every time the processing of Steps S501 to S503 described above is executed.

Figure 10:
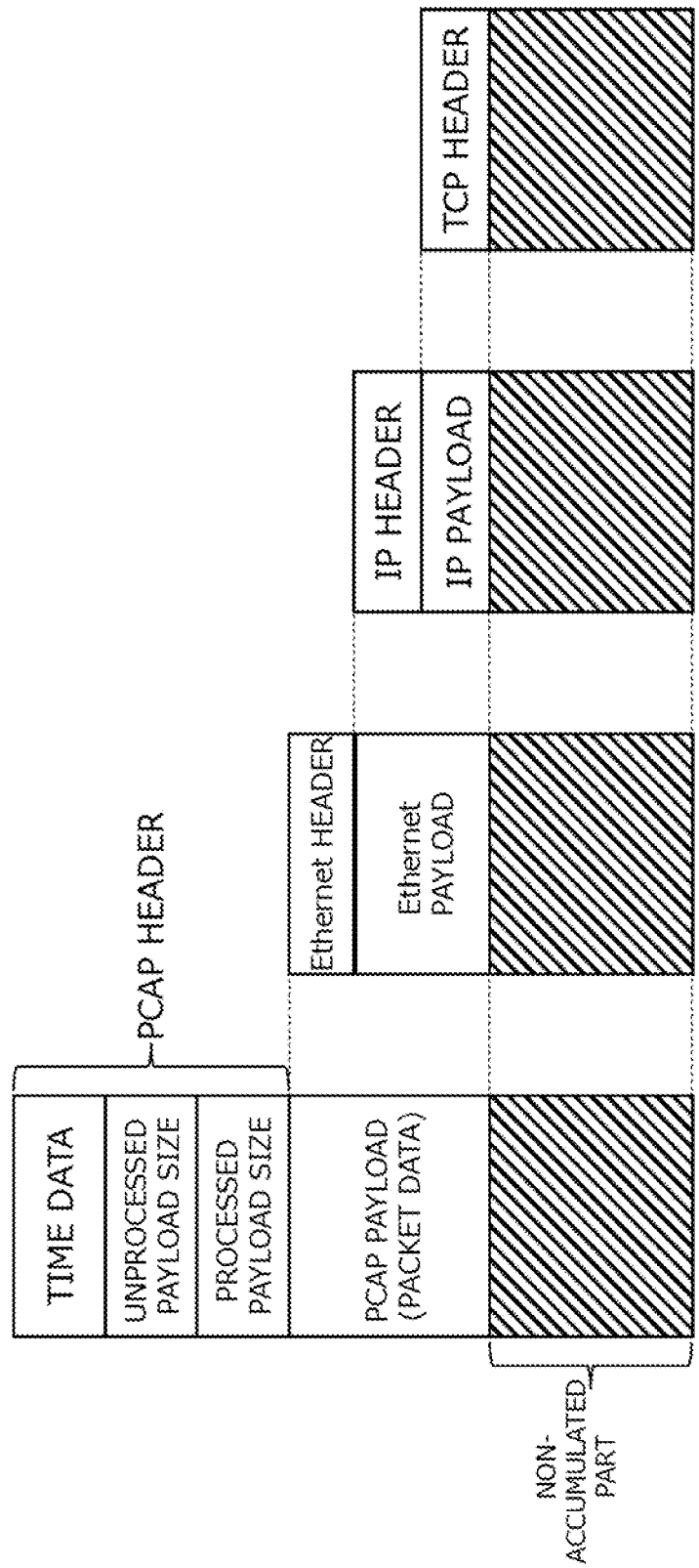
FIG. 10 is an explanatory diagram illustrating an example of communication data (PCAP data) accumulated through the data processing according to the first example embodiment of the present invention.

FIG. 10 is an explanatory diagram illustrating an example of communication data (PCAP data) accumulated through the data processing described above according to the present example embodiment. FIG. 10 illustrates one pair of a PCAP header and a PCAP payload, and illustrates, in particular, a property of communication data after an encrypted part (in other words, a part not used for communication analysis) is removed.

First, the PCAP payload will be described. As described above, in Step S503, the data processing unit 235 may remove an encrypted part of the communication data to be accumulated in accordance with the policy DB 225. In the example of FIG. 10, a part corresponding to an encrypted TCP payload (non-accumulated part of FIG. 10) of the unit communication data (frame) is removed by the data processing unit 235. When the unit communication data is encrypted in accordance with SSH, the entire TCP payload being a part of the frame is encrypted. The frame (Ethernet header+Ethernet payload) except for the removed part is included in the PCAP payload.

Next, the PCAP header will be described. The PCAP header includes time data, an unprocessed payload size (unprocessed size information), and a processed payload size (processed size information). The time data indicates time of acquisition of the frame corresponding to the PCAP payload paired with the PCAP header.

The unprocessed payload size is a value indicating the size of the unit communication data before being processed (before removal is performed) in Step S503. In contrast, the processed payload size is a value indicating the size of the unit communication data after being processed in Step S503 (the size of the PCAP payload to be actually accumulated).

With the PCAP data including the unprocessed payload size in the PCAP header, the property of communication is stored in the PCAP data even if the encrypted part of the unit communication data is removed.

According to the configuration of the present example embodiment described above, communication data (PCAP data) to be used for communication analysis can be appropriately accumulated in the communication analysis server 100. More specifically, because the communication data subjected to processing such as removal is provided with the unprocessed size information before the processing, capacity of the communication data can be appropriately reduced with information related to the property of the communication data being maintained.

For example, the following considers communication using Secure Socket Layer/Transport Layer Security (SSL/TLS) in which the TCP payload is encrypted. Theoretically, when the whole communication data is accumulated in SSL/TLS communication of 100 MB (approximately 72,000 packets), a PCAP file of 105 MB being the sum total of the encrypted TCP payload of 100 MB and the header (PCAP header, Ethernet header, IP header) of 5 MB is accumulated. In contrast, when the configuration of the present example embodiment described above is adopted, the encrypted TCP payload of 100 MB is not accumulated and only the header remains, and thus a PCAP file of a total of 5 MB is accumulated. Note that plaintext communication data may be accumulated, without being removed.

<<2.6. Example Alterations>>

The present example embodiment described above is altered in various manners. Examples of aspects of specific alterations are illustrated below. Two or more example aspects arbitrarily selected from the above example embodiment and the following examples may be combined as appropriate unless the example aspects are consistent with each other.

In the configuration described above, processing, such as removal, of the communication data is executed with reference to the parser DB 221 and the policy DB 225. In contrast, the following case may be assumed: it is not appropriate to process communication data based only on static information. For example, in a key exchange sequence in an encryption procedure, although a public key certificate or the like is not encrypted, plaintext data related to encryption is transmitted and received. The above plaintext data includes encryption-related information such as a type of a connection destination server and a user ID of a connection source, and is thus important in communication analysis such as security analysis.

However, in the configuration in which the communication data is processed based only on static information (for example, port numbers), the plaintext data including the encryption-related information as described above may be removed. Accordingly, in the following example alteration, processing, such as removal, of the communication data is executed also with reference to a communication state database (communication state DB) 223 in addition to the parser DB 221 and the policy DB 225.

Figure 11:
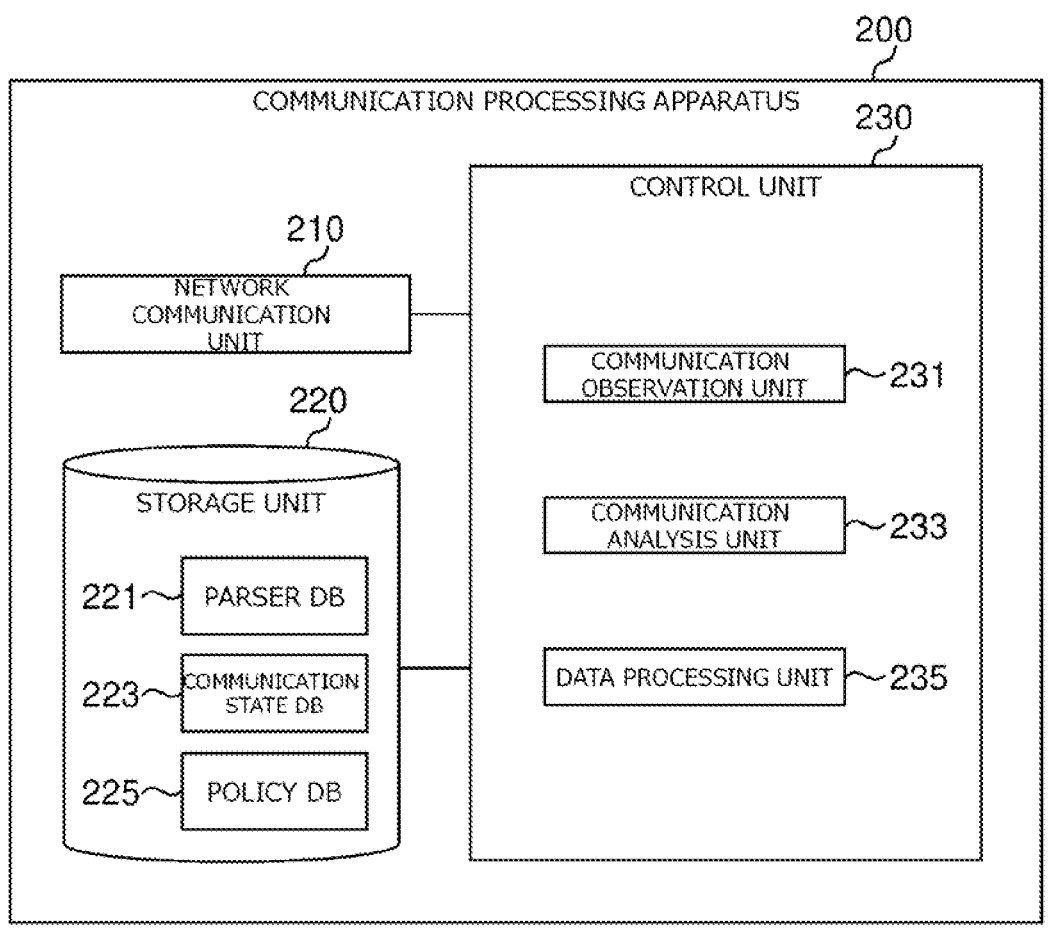
FIG. 11 is a block diagram illustrating a schematic configuration of a communication processing apparatus 200 according to an example alteration of the first example embodiment of the present invention.

FIG. 11 is a block diagram illustrating a schematic configuration of the communication processing apparatus 200 according to the present example alteration. The storage unit 220 according to the present example alteration includes the communication state DB 223 in addition to the parser DB 221 and the policy DB 225. Other elements are configured similarly to those of the communication processing apparatus 200 according to the first example embodiment described above with reference to FIG. 3.

FIG. 12 is an explanatory diagram illustrating an example of a configuration of the communication state DB 223 according to the present example alteration. The communication state DB 223 is a dynamic database that stores, at any time, a state of communication observed by the communication processing apparatus 200 (communication observation unit 231). For example, as illustrated in FIG. 12, the communication state DB 223 stores the number of uplink packets and the number of downlink packets, with a client IP address, a server IP address, and a protocol used as keys.

FIG. 13 is an explanatory diagram illustrating an example of a configuration of the policy DB 225 according to the present example alteration. The policy DB 225 of the present example alteration is a database that stores correspondence between a communication property (analysis results) related to communication data and processing depending on a communication state for the communication data. The processing of the present example alteration may require reference to a communication state.

In Step S502 of the present example alteration, the communication analysis unit 233 of the communication processing apparatus 200 analyzes the communication data with reference to the parser DB 221, acquires a communication state based on the communication data, and writes the communication state in the communication state DB 223. In Step S503 of the present example alteration, the data processing unit 235 of the communication processing apparatus 200 processes the communication data acquired by the communication observation unit 231 with reference to the policy DB 225, based on the communication property supplied from the communication analysis unit 233 and the communication state stored in the communication state DB 223.

For example, when the communication property identified with reference to the parser DB 221 is "SSL/TLS" (item number 4 of FIG. 8), the data processing unit 235 identifies the processing for the case of "SSL/TLS" with reference to the policy DB 225 of the present example alteration, and processes the communication data based on the communication state stored in the communication state DB 223. In other words, regarding uplink communication, the data processing unit 235 accumulates a payload up to the first 3 packets necessary for key exchange and removes subsequent communication data, whereas regarding downlink communication, the data processing unit 235 accumulates a payload up to the first 2 packets necessary for key exchange and removes subsequent communication data.

According to the configuration described above, technical effects similar to those of the example embodiment described above are exerted. In addition, dynamic control of accumulation of communication data based on the communication state DB 223 can be performed.

In the following, other example alterations will be described. In the following example alterations as well, technical effects similar to those of the example embodiment described above are exerted.

In the example embodiment described above, the communication processing apparatus 200 accesses the web server 400. However, the communication processing apparatus 200 may access any apparatus. For example, the communication processing apparatus 200 may access a Session Initiation Protocol (SIP) server used for software calls, or a regular personal computer (PC) used for general operations.

The communication analysis server 100 according to the present example embodiment may be an apparatus that simply accumulates and analyzes duplicated communication data, or may have a function as a relay apparatus that relays communication data in addition to the above function.

The communication processing system S in the example embodiment described above is connected to the Internet. However, the communication processing system S may be a network not connected to the Internet. For example, the communication processing system S may be connected to an exclusive factory network that is constructed in a specific factory.

Any encryption scheme can be applied to the configuration of the example embodiment described above. For example, a remote desktop function for remotely operating another PC is implemented with encryption processing other than SSL.

In the example embodiment described above, the data processing unit 235 removes an encrypted part of the communication data. However, the operation of the data processing unit 235 is not limited to the above.

For example, the data processing unit 235 may remove a binary data part of the communication data. According to the present configuration, a part highly likely to be encrypted (binary data part) can be removed without determining whether the part is encrypted.

The data processing unit 235 may remove a part of the communication data including confidential information or sensitive information. The confidential information or the sensitive information is not necessarily encrypted, but should be concealed for security. According to the present configuration, confidential information or sensitive information that should be concealed is removed, and therefore security is enhanced.

Moreover, when the communication data includes confidential information or sensitive information, the data processing unit 235 need not accumulate all the communication data. According to the present configuration, communication itself including the confidential information or the sensitive information is not accumulated, and therefore security is further enhanced.

In the example embodiment described above, the parser DB 221 stores correspondence between a port number (the transmission source port number or the destination port number) and the communication property. However, the parser DB 221 may store correspondence between another parameter and the communication property. For example, the parser DB 221 may store correspondence between an IP address (a transmission source IP address or a destination IP address) and the communication property.

The parser DB 221 may be used for the purpose of tagging. For example, when both of the transmission source IP address and the destination IP address are local IP addresses, in place of a protocol, a tag of "in-house communication" may be associated in the parser DB 221 as the communication property. In this case, in the policy DB 225, a definition may be provided that "in-house communication accumulates only the header".

Moreover, the parser DB 221 may store correspondence between entropy (parameter) of communication data and a tag (communication property) indicating a level of the entropy.

Similarly, in the policy DB 225 as well, various types of processing can be defined. For example, regarding communication data having a certain communication property, a definition may be provided that "data of x bytes from the start of the data is accumulated", or a definition may be provided that "data after y bytes from the start of the data is accumulated".

Moreover, when the protocol is "z", a definition may be provided that "the Ethernet header is accumulated", and when a specific tag is assigned, a definition may be provided that "the payload is not recorded".

Similarly, various communication states can also be stored in the communication state DB 223. For example, the amount of packets per unit time with an unrestricted protocol may be stored in the communication state DB 223 at any time. In this case, in the policy DB 225, when the amount of packets per unit time exceeds a predetermined threshold, a definition may be provided that "the payload is removed and only the header is accumulated". According to the present configuration, control depending on the entire volume of communication, that is so-called control by total volume, can be implemented.

3. Second Example Embodiment

Next, with reference to FIG. 14 and FIG. 15, a second example embodiment of the present invention will be described. While the first example embodiment described above is a specific example embodiment, the second example embodiment is a more generalized example embodiment.

<<3.1. Configuration of Communication Processing System Sa>>

Figure 14:
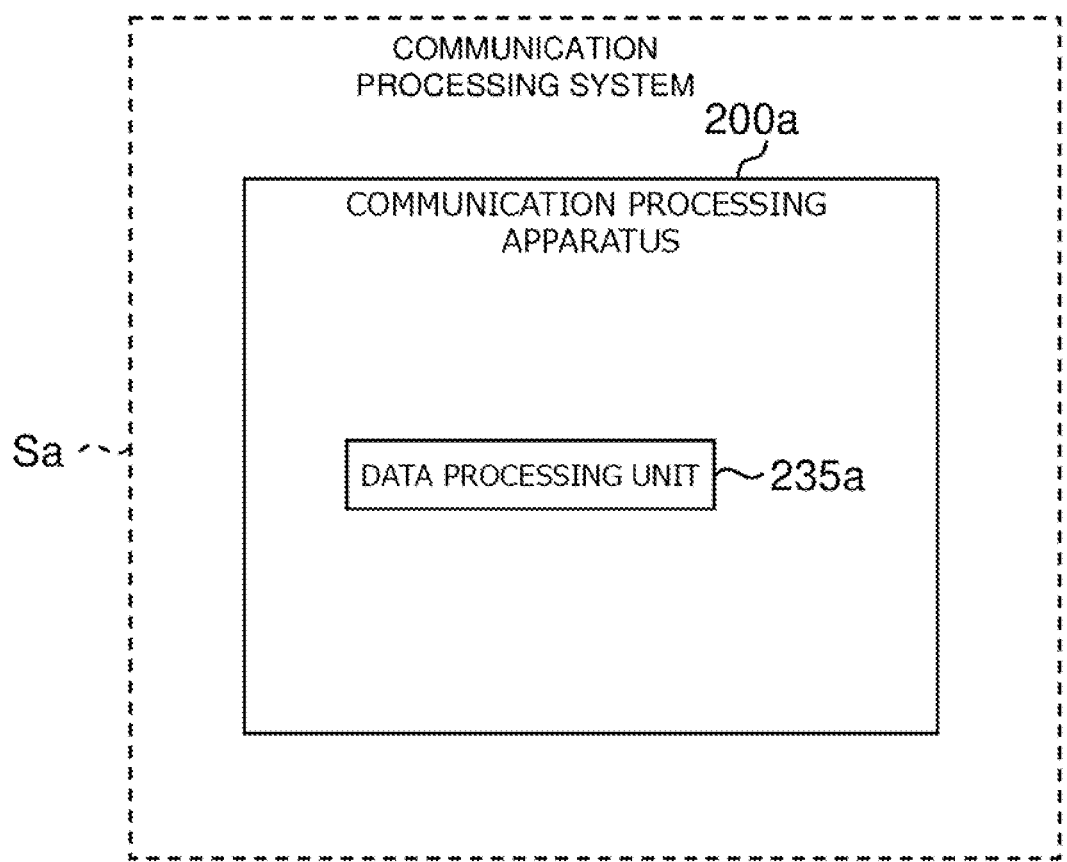
FIG. 14 is an explanatory diagram illustrating an example of a schematic configuration of a communication processing system Sa according to a second example embodiment of the present invention.

FIG. 14 is an explanatory diagram illustrating an example of a schematic configuration of a communication processing system Sa according to the second example embodiment. The communication processing system Sa accumulates communication data to be used for communication analysis. As illustrated in FIG. 14, the communication processing system Sa includes a communication processing apparatus 200a.

<<3.2. Configuration of Communication Processing Apparatus 200a>>

Figure 15:
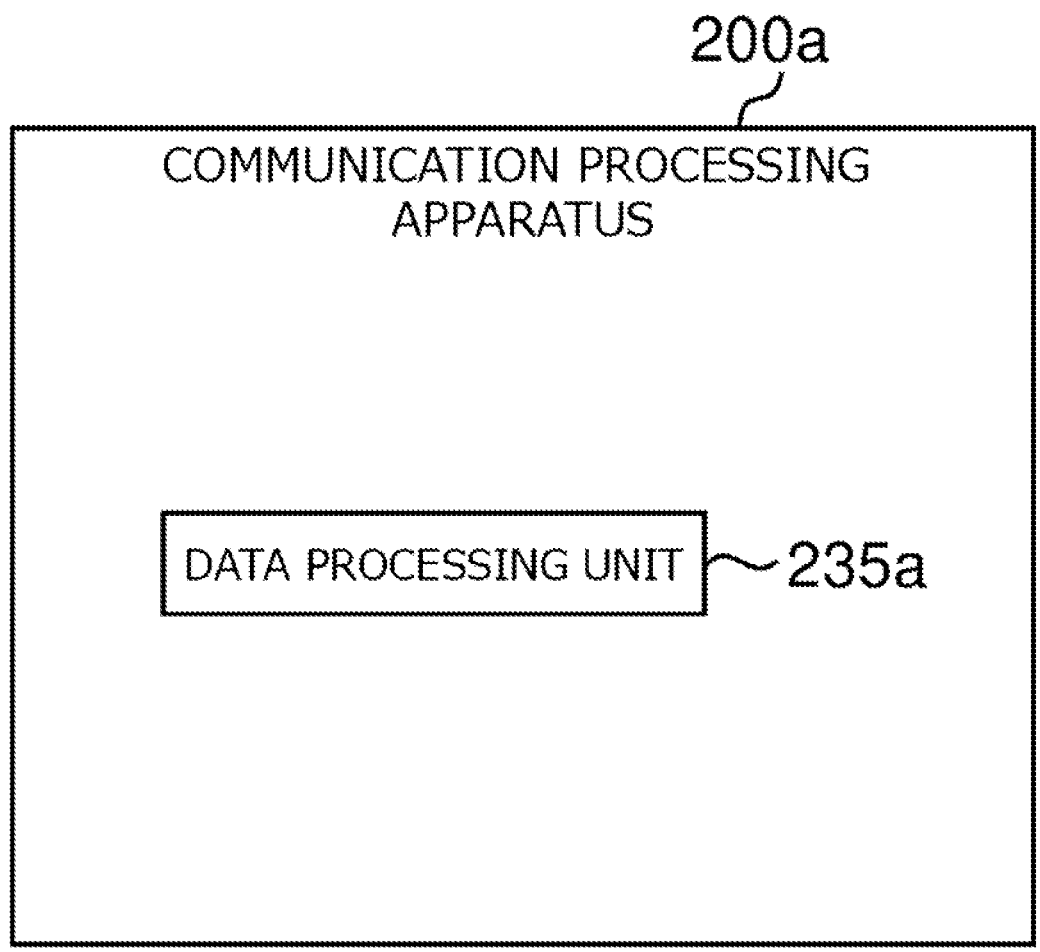
FIG. 15 is a block diagram illustrating a schematic configuration of a communication processing apparatus 200a according to the second example embodiment of the present invention.

FIG. 15 is a block diagram illustrating an example of a schematic configuration of the communication processing apparatus 200a according to the second example embodiment. As illustrated in FIG. 15, the communication processing apparatus 200a includes a data processing unit 235a.

The data processing unit 235a may be implemented with one or more processors and a memory (e.g., a nonvolatile memory and/or a volatile memory) and/or a hard disk. The memory may be included in the one or more processors or may be provided outside the one or more processors.

<<3.3. Operation Example>>

An operation example according to the second example embodiment will be described. The communication processing apparatus 200a (data processing unit 235a) removes at least a part of communication data to be accumulated, based on a communication property related to the communication data.

—Relationship with First Example Embodiment

As an example, the data processing unit 235a included in the communication processing apparatus 200a according to the second example embodiment may execute operations of the data processing unit 235 included in the communication processing apparatus 200 according to the first example embodiment. In the case described above, description regarding the first example embodiment can also be applied to the second example embodiment. Note that the second example embodiment is not limited to the example described above.

According to the second example embodiment described above, communication data to be used for communication analysis can be appropriately accumulated.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the flowchart. For example, the steps in the processing may be executed in order different from the order described in the flowchart or may be executed in parallel as long as the result of the processing described above is implemented. Some of the steps in the processing may be deleted, or more steps may be added to the processing.

An apparatus including constituent elements (e.g., the communication observation unit, the communication analysis unit, and/or the data processing unit) of the communication processing apparatus described in the Specification (e.g., one or more apparatuses (or units) among a plurality of apparatuses (or units) constituting the communication processing apparatus or a module for one of the plurality of apparatuses (or units)) may be provided.

Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A communication processing apparatus configured to accumulate communication data to be used for communication analysis, the communication processing apparatus including a data processing unit configured to remove at least a part of the communication data to be accumulated, based on a communication property related to the communication data.

(Supplementary Note 2)

The communication processing apparatus according to supplementary note 1, wherein
the data processing unit is configured to remove a non-accumulated part of the communication data, based on the communication property, the non-accumulated part being a part not used for the communication analysis.

(Supplementary Note 3)

The communication processing apparatus according to supplementary note 1 or 2, wherein
the data processing unit is configured to provide, to the communication data to be accumulated, unprocessed size information indicating capacity of the communication data before the removal.

(Supplementary Note 4)

The communication processing apparatus according to any one of supplementary notes 1 to 3, wherein
the data processing unit is configured to remove an encrypted part of the communication data.

(Supplementary Note 5)

The communication processing apparatus according to any one of supplementary notes 1 to 3, wherein
the data processing unit is configured to remove a binary data part of the communication data.

(Supplementary Note 6)

The communication processing apparatus according to any one of supplementary notes 1 to 3, wherein
the data processing unit is configured to remove a part of the communication data, the part including confidential information or sensitive information.

(Supplementary Note 7)

The communication processing apparatus according to any one of supplementary notes 1 to 3, wherein
the data processing unit is configured not to accumulate all the communication data when the communication data includes confidential information or sensitive information.

(Supplementary Note 8)

The communication processing apparatus according to any one of supplementary notes 1 to 7, further including
a communication analysis unit configured to identify the communication property of the communication data with reference to a parser database storing correspondence between a parameter of the communication data and the communication property.

(Supplementary Note 9)

The communication processing apparatus according to supplementary note 8, wherein
the data processing unit is configured to process the communication data with reference to a policy database storing correspondence between the communication property related to the communication data and processing for the communication data.

(Supplementary Note 10)

The communication processing apparatus according to supplementary note 9, wherein
the communication analysis unit is configured to acquire a communication state based on the communication data, and store the communication state in a communication state database, and
the data processing unit is configured to execute the processing identified with reference to the policy database on the communication data, based on the communication state stored in the communication state database.

(Supplementary Note 11)

The communication processing apparatus according to any one of supplementary notes 8 to 10, wherein
the parameter of the communication data stored in the parser database includes at least one of transmission time, a transmission source IP address, a destination IP address, a transmission source port number, a destination port number, a protocol, and a flag.

(Supplementary Note 12)

The communication processing apparatus according to any one of supplementary notes 1 to 11, wherein
the data processing unit is configured to transfer processed communication data being the communication data subjected to processing to another apparatus and causes said another apparatus to accumulate the processed communication data.

(Supplementary Note 13)

The communication processing apparatus according to any one of supplementary notes 1 to 11, wherein
the data processing unit is configured to accumulate processed communication data being the communication data subjected to processing in the communication processing apparatus.

(Supplementary Note 14)

A communication processing system configured to accumulate communication data to be used for communication analysis, the communication processing system including
a communication processing apparatus provided with a data processing unit configured to remove at least a part of the communication data to be accumulated, based on a communication property related to the communication data.

(Supplementary Note 15)

A communication processing method for accumulating communication data to be used for communication analysis, the communication processing method including
removing at least a part of the communication data to be accumulated, based on a communication property related to the communication data.

(Supplementary Note 16)

A program that causes a computer to execute:
accumulating communication data to be used for communication analysis; and
removing at least a part of the communication data to be accumulated, based on a communication property related to the communication data.

INDUSTRIAL APPLICABILITY

Communication data to be used for communication analysis can be appropriately accumulated.

REFERENCE SIGNS LIST

S Communication Processing System
100 Communication Analysis Server
200 Communication Processing Apparatus
221 Parser DB
223 Communication State DB
225 Policy DB
233 Communication Analysis Unit
235 Data Processing Unit

What is claimed is:

1. A communication processing apparatus configured to accumulate communication data to be used for communication analysis, the communication processing apparatus comprising:
a memory storing instructions; and
one or more processors configured to execute the instructions to:
receive communication data from another apparatus via a network;
remove at least a part of the communication data to be accumulated, based on a communication property related to the communication data;
identify, with reference to a parser database storing correspondence between entropy of the communication data as a parameter of the communication data and a tag indicating a level of the entropy as the communication property, the tag indicating the communication property of the communication data;
process the communication data with reference to the policy database storing correspondence between the communication property related to the communication data and processing for the communication data;
acquire a communication state based on the communication data, and store the communication state in a communication state database; and
execute the processing identified with reference to the policy database on the communication data, based on the communication state stored in the communication state database.

2. The communication processing apparatus according to claim 1, wherein
the one or more processors are configured to execute the instructions to remove a non-accumulated part of the communication data, based on the communication property, the non-accumulated part being a part not used for the communication analysis.

3. The communication processing apparatus according to claim 1, wherein
the one or more processors are configured to execute the instructions to provide, to the communication data to be accumulated, unprocessed size information indicating capacity of the communication data before the removal.

4. The communication processing apparatus according to claim 1, wherein
the one or more processors are configured to execute the instructions to remove an encrypted part of the communication data.

5. The communication processing apparatus according to claim 1, wherein
the one or more processors are configured to execute the instructions to remove a binary data part of the communication data.

6. The communication processing apparatus according to claim 1, wherein
the one or more processors are configured to execute the instructions to remove a part of the communication data, the part including confidential information or sensitive information.

7. The communication processing apparatus according to claim 1, wherein
the one or more processors are configured to execute the instructions not to accumulate all the communication data when the communication data includes confidential information or sensitive information.

8. The communication processing apparatus according to claim 1, wherein the parameter of the communication data stored in the parser database includes at least one of transmission time, a transmission source IP address, a destination IP address, a transmission source port number, a destination port number, a protocol, and a flag.

9. The communication processing apparatus according to claim 1, wherein
the one or more processors are configured to execute the instructions to transfer processed communication data being the communication data subjected to processing to another apparatus and causes said another apparatus to accumulate the processed communication data.

10. The communication processing apparatus according to claim 1, wherein
the one or more processors are configured to execute the instructions to accumulate processed communication data being the communication data subjected to processing in the communication processing apparatus.

11. A communication processing system configured to accumulate communication data to be used for communication analysis, the communication processing system comprising
a communication processing apparatus, comprising:
a memory storing instructions; and
one or more processors configured to execute the instructions to:
receive communication data from another apparatus via a network;
remove at least a part of the communication data to be accumulated, based on a communication property related to the communication data;
identify, with reference to a parser database storing correspondence between entropy of the communication data as a parameter of the communication data and a tag indicating a level of the entropy as the communication property, the tag indicating the communication property of the communication data;
process the communication data with reference to the policy database storing correspondence between the communication property related to the communication data and processing for the communication data;
acquire a communication state based on the communication data, and store the communication state in a communication state database; and
execute the processing identified with reference to the policy database on the communication data, based on the communication state stored in the communication state database.

12. A communication processing method for accumulating communication data to be used for communication analysis, the communication processing method comprising:
receiving communication data from another apparatus via a network;
removing at least a part of the communication data to be accumulated, based on a communication property related to the communication data;
identifying, with reference to a parser database storing correspondence between entropy of the communication data as a parameter of the communication data and a tag indicating a level of the entropy as the communication property, the tag indicating the communication property of the communication data;
processing the communication data with reference to the policy database storing correspondence between the communication property related to the communication data and processing for the communication data;
acquiring a communication state based on the communication data, and store the communication state in a communication state database; and
executing the processing identified with reference to the policy database on the communication data, based on the communication state stored in the communication state database.

13. A non-transitory computer readable recording medium storing a program that causes a computer to execute:
receiving communication data from another apparatus via a network;
removing at least a part of the communication data to be accumulated, based on a communication property related to the communication data;
identifying, with reference to a parser database storing correspondence between entropy of the communication data as a parameter of the communication data and a tag indicating a level of the entropy as the communication property, the tag indicating the communication property of the communication data;
processing the communication data with reference to the policy database storing correspondence between the communication property related to the communication data and processing for the communication data;
acquiring a communication state based on the communication data, and store the communication state in a communication state database; and
executing the processing identified with reference to the policy database on the communication data, based on the communication state stored in the communication state database.

* * * * *